(12) United States Patent
Juhasz

(10) Patent No.: US 10,132,947 B2
(45) Date of Patent: Nov. 20, 2018

(54) MARINE DATA ACQUISITION NODE

(71) Applicant: PGS Geophysical AS, Oslo (NO)

(72) Inventor: Andras Robert Juhasz, Kista (SE)

(73) Assignee: PGS Geophysical AS, Oslo (NO)

( * ) Notice: Subject to any disclaimer, the term of this patent is extended or adjusted under 35 U.S.C. 154(b) by 12 days.

(21) Appl. No.: 15/281,846

(22) Filed: Sep. 30, 2016

(65) Prior Publication Data

US 2017/0108610 A1    Apr. 20, 2017

Related U.S. Application Data

(60) Provisional application No. 62/243,214, filed on Oct. 19, 2015.

(51) Int. Cl.
    *G01V 3/00*    (2006.01)
    *G01V 1/38*    (2006.01)
    *G01V 1/18*    (2006.01)
    *G01V 3/02*    (2006.01)

(52) U.S. Cl.
    CPC .............. *G01V 1/3843* (2013.01); *G01V 1/18* (2013.01); *G01V 3/02* (2013.01)

(58) Field of Classification Search
    CPC .. G01R 31/40; G01R 31/2841; G01R 31/001; G01R 31/2889; G01L 27/002
    USPC .................................... 324/750.01, 500, 537
    See application file for complete search history.

(56) References Cited

U.S. PATENT DOCUMENTS

| | | | |
|---|---|---|---|
| 4,353,071 A | 10/1982 | Bernstein et al. | |
| 4,617,518 A | 10/1986 | Smka | |
| 5,793,214 A * | 8/1998 | Wakamatsu | G01N 27/023 324/127 |
| 7,242,176 B2 * | 7/2007 | Thomason | G01R 31/002 324/501 |
| 7,529,627 B2 | 5/2009 | Lisitsyn et al. | |
| 7,733,740 B2 | 6/2010 | Hillesund et al. | |
| 7,834,632 B2 | 11/2010 | Tenghamn et al. | |
| 7,952,375 B2 * | 5/2011 | Eldridge | G01R 1/06711 324/754.03 |
| 8,710,845 B2 | 4/2014 | Lindqvist | |
| 8,896,313 B2 | 11/2014 | Lindqvist | |
| 9,285,495 B2 | 3/2016 | Erneland | |
| 9,995,834 B2 * | 6/2018 | Tenghamn | G01V 1/133 |
| 9,995,846 B2 * | 6/2018 | Erneland | G01V 1/201 |
| 10,001,575 B2 * | 6/2018 | Borresen | G01V 1/3808 |
| 2004/0000912 A1 | 1/2004 | Conti et al. | |
| 2006/0238200 A1 | 10/2006 | Johnstad | |
| 2008/0246485 A1 | 10/2008 | Hibbs et al. | |

(Continued)

OTHER PUBLICATIONS

Constable et al., Special Section—Marine Controlled-Source Electromagnetic Methods:, Geophysics, vol. 72, No. 2, Mar.-Apr. 2007.

*Primary Examiner* — Giovanni Astacio-Oquendo

(57) ABSTRACT

Disclosed are systems and methods for marine geophysical surveying. An example system an electromagnetic source configured to emit an energy field into a body of water; a marine data acquisition node comprising: a base having a buoyancy such that the base is configured to float in a body of water; a geophysical sensor coupled to the base; a weight configured to anchor the marine data acquisition node to a water bottom; and a line connected between the weight and the base configured to prevent the base from floating to a surface of the body of water.

30 Claims, 5 Drawing Sheets

(56) References Cited

U.S. PATENT DOCUMENTS

| | | |
|---|---|---|
| 2008/0309346 A1 | 12/2008 | MacGregor et al. |
| 2009/0001986 A1 | 1/2009 | Besson et al. |
| 2009/0184715 A1 | 7/2009 | Summerfield et al. |
| 2009/0195251 A1 | 8/2009 | Darnet et al. |
| 2009/0265111 A1 | 10/2009 | Helwig et al. |
| 2009/0295394 A1 | 12/2009 | Babour et al. |
| 2009/0315539 A1 | 12/2009 | Helwig et al. |
| 2011/0228635 A1 | 9/2011 | Tenghamn |
| 2012/0250456 A1 | 10/2012 | Tenghamn |

\* cited by examiner

MARINE DATA ACQUISITION NODE

CROSS-REFERENCE TO RELATED APPLICATIONS

The present application claims the benefit of U.S. Provisional Application No. 62/243,214, filed Oct. 19, 2015, entitled "Marine Data Acquisition Node," the entire disclosure of which is incorporated herein by reference.

BACKGROUND

Techniques for marine geophysical surveying include seismic surveying and electromagnetic surveying, in which geophysical data may be collected from below the Earth's surface. Marine geophysical surveying has applications in mineral and energy exploration and production and may be used to help identify locations of hydrocarbon-bearing formations. Certain types of marine geophysical surveying, including seismic and electromagnetic surveying, may include using a survey vessel to tow an energy source at selected depths—typically above the seafloor—in a body of water. The energy source can emit energy, for example, seismic or electromagnetic energy, into the body of water that interacts with subterranean formations below the water bottom. Sensors may be used to detect changes in the energy field due to the interaction with the subterranean formation and generate response signals that can be used to infer certain properties of the subsurface formation, such as structure, mineral composition and fluid content, thereby providing information useful in the recovery of hydrocarbons.

In conventional systems, the sensors may be located in marine data acquisition nodes positioned directly on the water bottom. However, positioning the marine data acquisition node directly on the water bottom may have disadvantages. One such disadvantage may be that the acquired geophysical data may be affected by local variations of resistivity and/or acoustic impedance. For example, stones, bottom structures, and/or varying bathymetry may cause local variations of resistivity and/or acoustic impedance. Another disadvantage that may arise for marine data acquisition nodes positioned directly on the seafloor may be the housing containing the electrodes used for recording an electromagnetic field. The housing and electrodes may protrude from the marine data acquisition node and may bend, for example, due to unsuitable positioning of the marine data acquisition node, which may produce errors in the acquired geophysical data. Yet, another disadvantage that may arise for marine data acquisition nodes positioned directly on the seafloor may be that an acquisition node may get stuck in a bottom structure and/or among stones, which may affect the measured geophysical data.

BRIEF DESCRIPTION OF THE DRAWINGS

These drawings illustrate certain aspects of systems and methods of the present disclosure and should not be used to limit or define the systems and methods.

DETAILED DESCRIPTION

Figure 1:
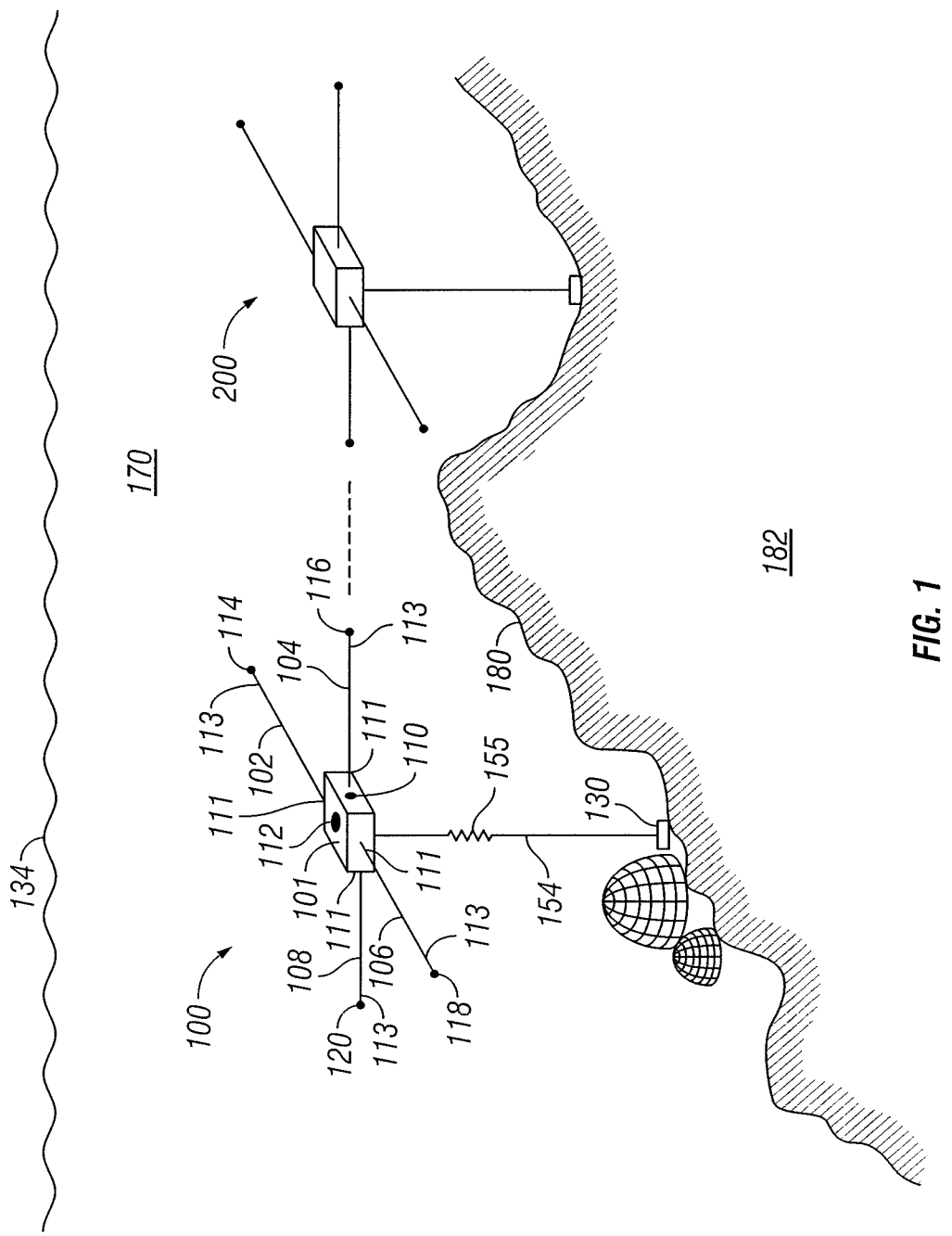
FIG. 1 is a schematic illustration of a marine data acquisition node anchored to the water bottom, in accordance with example embodiments.

This disclosure is related generally to the field of marine geophysical surveying. Marine geophysical surveying may include, for example, seismic and/or electromagnetic surveying, among others, in which geophysical data may be collected regarding subsurface formations.

In some embodiments, a marine data acquisition node may be provided that comprises a base and a geophysical sensor coupled to the base. In accordance with example embodiments, the base of the marine data acquisition node may be positioned near the bottom of a body of water, such as, for example, a water bottom. However, the base of the marine data acquisition node may not be positioned directly on the water bottom. In contrast to some currently used approaches in which the marine data acquisition node may be positioned directly on the water bottom, the base of the marine data acquisition node may have a buoyancy such that the base may float a certain distance above the water bottom. By way of example, embodiments may further include a weight coupled to a line of a certain length. Without limitation, the line may couple the weight to the base. In operation, the weight may be positioned on the bottom of the body of water such that the base of the marine data acquisition node floats a certain distance above the water bottom.

Although the following discussion relates to a first marine data acquisition node 100, it should be understood that it also equally applies to a second marine data acquisition node 200, as the first marine data acquisition node 100 is substantially identical to the second marine data acquisition node 200 of the present disclosure. Further, marine data acquisition nodes in addition to second marine data acquisition node 200 may also be substantially identical to first and second marine data acquisition nodes 100, 200. In some embodiments, marine data acquisition node 100 may be used with a dissimilar marine data acquisition node.

A marine data acquisition node may comprise a base having a buoyancy such that the base is configured to float in a body of water; a geophysical sensor coupled to the base; a weight configured to anchor the base to a water bottom; and a line connected between the weight and the base configured to prevent the base from floating to a surface of the body of water.

A marine electromagnetic survey method may comprise deploying a marine data acquisition node in a body of water, wherein the marine data acquisition node may comprise a base having a buoyancy such that the base floats in the body of water; a geophysical sensor coupled to the base; a weight that anchors the marine data acquisition node to a water bottom; and a line connected between the weight and the base that prevents the base from floating to a surface of the body of water; and emitting an energy field into the body of water. The method may further comprise detecting changes in the energy field with the marine data acquisition node due to an interaction with a subterranean formation.

A method of manufacturing a geophysical data product may comprise deploying a marine data acquisition node in a body of water, wherein the marine data acquisition node comprises: a base having a buoyancy to float in the body of water; a geophysical sensor coupled to the base; a weight that anchors the marine data acquisition node to a water bottom; and a line. The method may further comprise emitting an energy field into the body of water. The method may further comprise measuring one or more components of the energy field with the marine data acquisition node. The method may further comprise recording the measurements made with marine data acquisition node on one or more non-transitory computer readable media, thereby creating the geophysical data product.

An electromagnetic survey system may comprise an electromagnetic source configured to emit an energy field into a body of water; a marine data acquisition node comprising a base having a buoyancy such that the base is configured to float in the body of water; a geophysical sensor coupled to the base; a weight configured to anchor the base to a water bottom; and a line connected between the weight and the base configured to prevent the base from floating to a surface in the body of water.

FIG. 1 illustrates a marine data acquisition node, such as first marine data acquisition node 100, in accordance with example embodiments. As illustrated, first marine data acquisition node 100 may be configured to deploy in body of water 170. First marine data acquisition node 100 may include a base 101. The base may have a buoyancy such that the base 101 floats in the body of water 170. In some embodiments, the base 101 may include at least one arm, such as, for example, arms 102, 104, 106 and 108. The base 101 may be of a three-dimensional shape, including, but not limited to, a cylinder, a cone, a sphere, a cube, a pyramid, a prism, or any combination thereof. Base 101 may include a hollow interior chamber. Base 101 may also include a lateral surface area, for example, lateral faces. Without limitation, the base 101 may be constructed, for example, from a rigid, high strength, high density plastic or another rigid, high strength material suitable for subsea deployment. Base 101 may also be constructed from metal which may be totally isolated from any electronics. Where base 101 is utilized as an electrode, the surface (outer layer) of the base 101 may be constructed from a material suitable for use as an electrode, such as Ag/AgCl (which a person of ordinary skill would recognize as silver-silver chloride), whereas, an inner layer (main material) of the base 101 may be constructed from, for example, titanium, stainless steel or any other non-corrosive alloy with sufficient strength to withstand pressure at various depths in a body of water. Additionally, the base 101 may be constructed from an electrically non-conducting material.

In some embodiments, the base 101 may include sensor electronics 110 disposed within base 101. The sensor electronics 110 may include a wide variety of devices (none shown separately) for operating the first marine data acquisition node 100. The sensor electronics 110 may include, for example, electronics for sampling and logging the geophysical data sensed by the receiver electrodes 114, 116, 118, and 120. The sensor electronics 110 may also include recording electronics, control electronics, and/or data storage associated with the receiver electrodes 114, 116, 118, and 120. For example, the sensor electronics 110 may include electronic memory and/or a signal processor. Additionally, the sensor electronics 110 may further include a magnetometer, a tilt sensor, and/or a battery. To conserve battery life, the sensor electronics 110 may be turned on at deployment or in the body of water 170, for example.

In some embodiments, sensor electronics 110 may further include an acoustic location system. The acoustic location system may include any of a variety of devices (none shown separately) for generating acoustic signals that may be used to determine the location of first marine data acquisition node 100. The acoustic location system may include, for example, an acoustic responder and/or a compass to determine orientation and approximate direction of the first marine data acquisition node 100.

In some embodiments, first marine data acquisition node 100 may further include a geophysical sensor, such as, for example, receiver electrodes 114, 116, 118, and 120. The geophysical sensors may be operable to generate a signal that is related to a parameter being measured by the geophysical sensor. The geophysical sensors may be any type of geophysical sensor known in the art, including seismic sensors, such as hydrophones, geophones, particle velocity sensors, particle displacement sensors, particle acceleration sensors, or pressure gradient sensors, or electromagnetic field sensors, such as electrodes (e.g., receiver electrodes 114, 116, 118, and 120) or magnetometers. While FIG. 1 illustrates use of arms 102, 104, 106, 108 for supporting and positioning receiver electrodes 114, 116, 118, and 120, it should be understood that arms 102, 104, 106, 108 may not be required and that geophysical sensors may be disposed on base 101, for example, without use of arms 102, 104, 106, 108. In operation, the geophysical sensors may detect energy that originated from an energy source (e.g., energy source 174 on FIG. 4) after it has interacted with subterranean formations 182 beneath the water bottom 180. By way of example, the geophysical sensors may generate signals, such as electrical or optical signals, in response to the detected energy. The detected energy may be used to infer certain properties of the subsurface rock, such as structure, mineral composition and fluid content, thereby providing information useful in the recovery of hydrocarbons.

In some embodiments, base 101 may further include a buoyant material 112 coupled to the base 101. The buoyant material 112 may provide the buoyancy to the base 101 such that the base floats in the body of water 170. As illustrated, the buoyant material 112 may be disposed within the base 101. The buoyant material 112 may substantially fill the hollow interior chamber of base 101. However, while FIG. 1 illustrates the buoyant material 112 disposed within the base 101, embodiments may include other configurations for coupling the buoyant material 112 to the base 101, for example, the buoyant material 112 may be secured above the base 101 (e.g., with a line) providing buoyancy for the base 101 to float. Without limitation, the buoyant material 112 may add buoyancy so that the base 101 of first marine data acquisition node 100 may float a certain distance above water bottom 180. Additionally, buoyant material 112 may allow flotation to the surface for recovery when surveying is complete. Additionally, the buoyant material 112 may also exclude fluid (e.g., water) from the hollow interior chamber of base 101 and/or electrically insulate the various components inside base 101. A wide variety of materials may be used as the buoyant material 112, including a curable, synthetic urethane-based polymer or other gel-like substance that can be used to fill the hollow interior chamber of base 101. Additional materials that may be used for the buoyant material 112 include, without limitation, glass spheres, which may be mixed in an epoxy resin, for example.

In some embodiments, base 101 may further be ballasted, for example, by inclusion of a ballast material (not shown) disposed within the base 101. Base 101 may include a large air-filled cavity that may provide buoyancy and a ballasting weight (or thicker wall material) on the bottom of base 101 for the purpose of aligning the base 101. Base 101 may also include a compact non-buoyant electronics housing, a ballast material, and external weights. The ballast material may be selected and arranged in the base 101 so that the base 101 may float horizontally. Accordingly, even though the marine data acquisition node 100 may be deployed at a slope or ridge of water bottom 180, the ballast material may allow the base 101 to float horizontally rather than aligning to a water bottom slope (e.g., seafloor slope) as a marine data acquisition node positioned directly on the water bottom 180 may.

Each of arms 102, 104, 106, and 108 may be coupled to, or otherwise protrude from, base 101 by any means suitable, such as, for example, welds, screws, bolts, and/or other techniques known in the art. Each of the arms 102, 104, 106, and 108 may be made, for example, from a rigid, high strength, high density plastic or another rigid, high strength material suitable for subsea deployment. Additionally, each of the arms 102, 104, 106, and 108 may be constructed from an electrically non-conducting material.

Each of the arms 102, 104, 106, and 108 may be generally tubal in shape. For example, each of the arms 102, 104, 106, and 108 may each resemble a straight conduit, such as a straight pipe or tube, and include two ends, for example: a proximal end 111 and a distal end 113. The proximal end 111 of each arm 102, 104, 106, and 108 may be coupled to the lateral surface of base 101, such that each arm 102, 104, 106, and 108 forms a 90 degree angle with the lateral surface of the base 101, and extends longitudinally away from the base 101, as illustrated in FIG. 1. Alternatively, each angle may be about 30 degrees, about 45 degrees, or about 60 degrees from vertical. However, it should be understood that angles with measurements, i.e. degrees, other than the above stated measurements, may also be used in particular applications. Each arm 102, 104, 106, and 108 may be coupled to the base 101 at the same angle as each of the other arms or at a different angle than each of the other arms (staggered angles).

Each of the arms 102, 104, 106, and 108 may have a circular cross-section, or the cross-section may be, without limitation, triangular, square, pentagonal, hexagonal, or any combination thereof. Each of the arms 102, 104, 106, and 108 may have a different cross-sectional shape than the other arms (staggered cross-sectional shapes), or the cross sectional shape may be the same for all of the arms 102, 104, 106, and 108. Each of the arms 102, 104, 106, and 108 may define a longitudinally oriented interior chamber (not shown) that extends along the length of each of the arms 102, 104, 106, and 108, and may be closed at both ends, for example. Each of the arms 102, 104, 106, and 108 may have a length, for example, of about 1-25 meters, about 1 meter to about 4 meters, about 4 meters to about 7 meters, about 7 meters to about 10 meters, about 10 meters to about 13 meters, about 13 meters to about 16 meters, about 16 meters to about 19 meters, or about 22 meters to about 25 meters. However, it should be understood that ranges for lengths other than the above stated ranges, may also be used in particular applications. The arms 102, 104, 106, and 108 may have a diameter, for example of about 5 centimeters to about 50 centimeters or about 10 centimeters to about 20 centimeters. However, it should be understood that ranges for diameters other than the above stated ranges, may also be used in particular applications. Also, each of arms 102, 104, 106, and 108 may have the same diameters and/or lengths as each of the other arms, or different diameters (staggered diameters) and/or lengths (staggered lengths) than each of the other arms.

The arms 102, 104, 106, and 108 may each include at least one geophysical sensor, such as receiver electrodes 114, 116, 118, and 120. The receiver electrodes 114, 116, 118, and 120 may be used for electric field measurement. By way of example, the receiver electrodes 114, 116, 118, and 120 may measure one or more components of the energy field. The energy field may be an electromagnetic field. Each of the receiver electrodes 114, 116, 118, and 120 may be mounted in the distal end 113 of each of the arms 102, 104, 106, and 108. Alternatively, the receiver electrodes 114, 116, 118, and 120 may be mounted along the length (from and including the proximal end 111 to and including the distal end 113) of each of the arms 102, 104, 106, and 108, and have a longitudinal separation, for example, of about 1 meter, about 3 meters, about 5 meters, about 7 meters, or about 10 meters. However, it should be understood that ranges for longitudinal separation other than the above stated ranges, may also be used in particular applications. Also, as would be understood by one of ordinary skill in the art with the benefit of this disclosure, a greater separation between the electrodes may enhance the ability to detect electric field data; thus, location of the receiver electrodes 114, 116, 118, and 120 at or near the distal end 113 of each of the arms 102, 104, 106, and 108 may be desirable. Additionally, the longitudinal separation for a particular one of the receiver electrodes 114, 116, 118, and 120 on a corresponding one of the arms 102, 104, 106, and 108 may have the same longitudinal separation as each receiver electrode on the other arms or may have different longitudinal separation than the other receiver electrodes 114, 116, 118, and 120 on the other arms 102, 104, 106, and 108 (staggered separation).

The receiver electrodes 114, 116, 118, and 120 may be configured to be in contact with water when the first marine data acquisition node 100 is deployed in the body of water 170. Without limitation, the receiver electrodes 114, 116, 118, and 120 may be configured to detect changes in an energy field due to the interaction with a subsurface rock formation, such as one or more parameters related to the energy field (e.g., voltage). The receiver electrodes 114, 116, 118, and 120 may be any of a variety of electrodes suitable for use in marine EM surveying, including, for example, silver-silver chloride electrodes. Electrical conductors (not shown) extending between the receiver electrodes 114, 116, 118, 120 and sensor electronics 110 may electrically connect the receiver electrodes 114, 116, 118, and 120 with the sensor electronics 110 via the longitudinally oriented interior chamber (not shown) of each of the arms 102, 104, 106, and 108, as mentioned previously.

As illustrated in FIG. 1, first marine data acquisition node 100 may include at least one weight 130 configured to anchor first marine data acquisition node 100 to the water bottom 180. Additionally, the weight 130 may include a pressure sensor to measure depth and position in relation to a marine data acquisition node. The weight 130 may be fabricated out of materials, such as, for example, stainless steel, galvanized steel, titanium, metal alloys, or any combination thereof. The weight 130 may be hydrodynamically shaped, such as, for example, oval shaped, oblong shaped, or rocket shaped. Weight 130 may be coupled to base 101 by way of line 154. The line 154 may include, for example, rope, chain, wire, nylon, or other suitable anchor lines.

Line 154 may have a certain length, for example, a line length between about 1 meter and about 100 meters, such that the base 101 of first marine data acquisition node 100, once deployed, may hover at a constant distance above water bottom 180, or a constant distance from the water surface 134. Other ranges for line lengths may include about 1 meter to about 50 meters, about 50 meters to about 100 meters, about 100 meters to about 150 meters, about 150 meters to about 200 meters, about 200 meters to about 250 meters, or about 250 to about 300 meters. However, it should be understood that ranges for line lengths other than the above stated ranges, may also be used in particular applications. A release mechanism 155 to release the first marine data acquisition node 100 may be provided at one or more locations along the line 154. Release mechanism 155 may include any suitable mechanism for decoupling the line 154 between the weight 130 and the base 101, including, without limitation, a burn wire or a releasable latch, among others. The release mechanism 155 may be operated, for example, by sensor electronics 110. Where the release mechanism 155 may include a burn wire, for example, a constant current (e.g., 1.60±0.05 amps) may be applied, when activated by sensor electronics 110, to heat burn wire, such that burn wire is severed, thereby releasing the first marine data acquisition node 100. The length of the burn wire may be the same or different than the length of the line 154. Additionally, a plurality of release mechanisms 155 (e.g., burn wires, releasable latches, etc.) may be provided along the line 154 at different locations to allow for release of the first marine data acquisition node 100, for example, in the event that lower portions of the lines are stuck. Where there is a plurality of release mechanisms 155 coupled to the line 154, at least one burn release mechanism 155 among the plurality of release mechanisms 155 may be coupled to the line 154 at a location that may be higher than a location of the water bottom 180 and/or seafloor debris. This arrangement may provide several advantages and properties to the first marine data acquisition node 100, such as, for example, the first marine data acquisition node 100 may be less likely to get stuck in seafloor stones and/or debris than a marine data acquisition node positioned directly on the water bottom 180, and the line 154 coupling the weight 130 including a number of release mechanisms 155 may facilitate returning the first marine data acquisition node 100 to the water surface 134. Also, the base 101 of first marine data acquisition node 100 hovering at a distance above the water bottom 180 may result in the acquired electromagnetic and/or seismic data being less sensitive to local variations in the water bottom 180 than a marine data acquisition node positioned directly on the water bottom 180. For first marine data acquisition node 100, the arms 102, 104, 106, and 108 may be free in the body of water 170 as opposed to previous approaches that included a marine data acquisition node positioned on the water bottom 180. This may reduce, mitigate, and/or eliminate bending of the arms 102, 104, 106, and 108 that may result from contact with water bottom 180 objects, such as stones and/or debris if the arms 102, 104, 106, and 108 were placed on the water bottom 180.

Figure 2A:
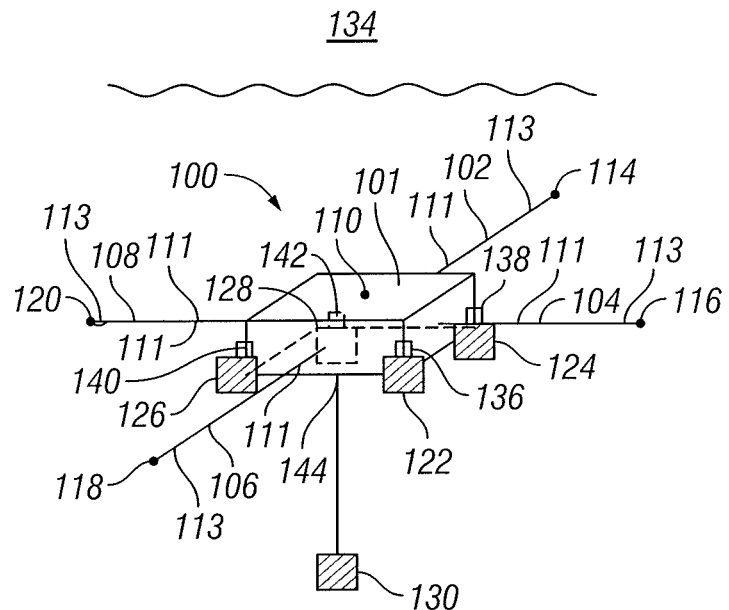
FIGS. 2A-2C are schematic illustrations of a marine data acquisition node utilizing multiple weights, in accordance with example embodiments.

Referring now to FIG. 2a, an embodiment of first marine data acquisition node 100 is illustrated that uses a plurality of weights, for example, weights 122, 124, 126, 128 and 130, configured to anchor first marine data acquisition node 100 to the water bottom 180. Each of the weights 122, 124, 126, 128 and 130 may be coupled to base 101 by way of lines 146, 148, 150, 152, and 154, respectively. Each line may have a certain length, for example, a length between 1 and 100 meters, such that the base 101 of first marine data acquisition node 100, once deployed, may hover at a constant distance above the water bottom 180, or a constant distance from the water surface 134. Additionally, base 101 may move from a first distance above water bottom 180 to a second distance above water bottom 180 after the marine data acquisition node 100 is deployed. As previously described, embodiments may further include release mechanisms 155 (e.g., shown on FIG. 1) or other suitable release point to release the first marine data acquisition node 100 at one or more locations along the lines 146, 148, 150, 152, 154.

The base 101 may include at least one retractable device, for example, such as spools 136, 138, 140, 142 and 144. Each of the lines 146, 148, 150, 152, and 154 may be reeled on each of the spools 136, 138, 140, 142, and 144, respectively.

Figure 2B:
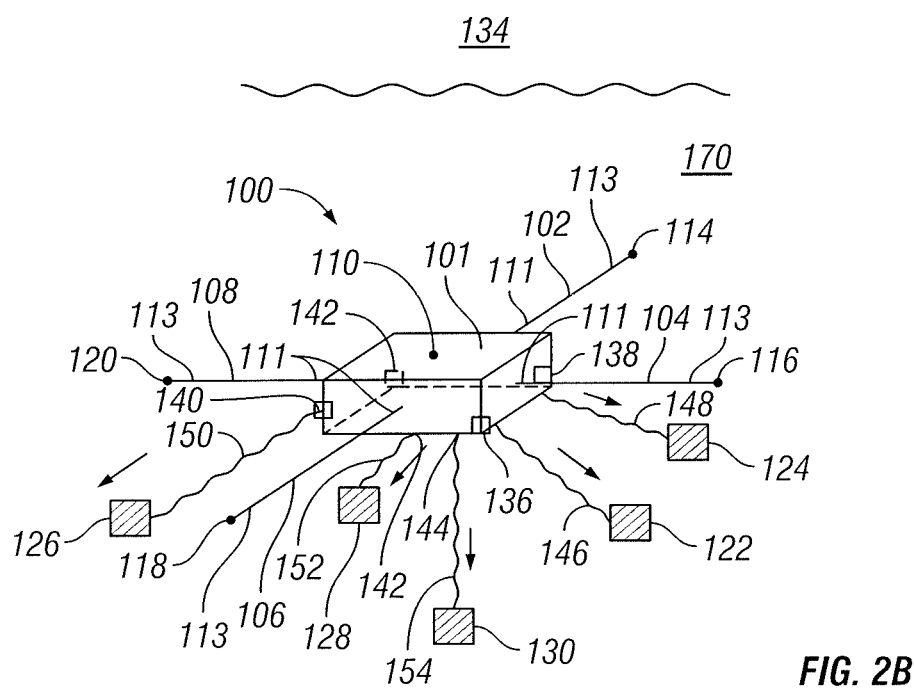

As illustrated in FIG. 2B, each of the spools 136, 138, 140, 142, and 144 may extend each of the lines 146, 148, 150, 152, and 154, respectively, as each of the spools spins in one direction. Alternatively, each of the spools 136, 138, 140, 142, and 144 may retract each of the lines 146, 148, 150, 152, and 154, respectively, as each spool spins in the opposite direction. For example, counterclockwise spinning may shorten each line, while clockwise spinning may lengthen each line. Alternatively, clockwise spinning may shorten each line, while counterclockwise spinning may lengthen each line. The plurality of lines 146, 148, 150, 152, and 154 may be adjusted so that the marine data acquisition node 100 is level.

Referring to FIGS. 2A and 2B, each of the spools 136, 138, 140, 142, and 144 may be mounted on the lateral surface of the base 101, such as, for example, each of the spools 136, 138, 140, 142 may be mounted near a bottom portion of each of the lateral faces of the base 101, such that, when the lines 146, 148, 150, 152, are completely retracted, the weights 122, 124, 126, 128 abut portions of the lateral surface of the base 101, such as, for example, portions of the bottom corners of the base 101 (e.g., wherein the base 101 is cube shaped). Spool 144 may be mounted on the center of the bottom side (seafloor facing side) of base 101, such that weight 130 abuts the center of the bottom side (seafloor facing side) of base 101, where line 154 is completely retracted. Where line 154 is extended, weight 130 may anchor first marine data acquisition node 100 to the water bottom 132. Techniques for mounting the spools 136, 138, 140, 142, and 144 to the base 101 may include any suitable technique known in the art, such as, for example, bolting, screwing, welding, and/or other techniques known in the art. It should be understood that spools 136, 138, 140, 142 are merely examples and that other suitable retractable devices may be used on base 101 to retrieve and/or extend lines 146, 148, 150, 152, and 154. For example, any suitable device may be use to adjust the distance of the base 101 above the water bottom 132. In some embodiments, after deployment, the distance of the base 101 above the water bottom 132 may be adjusted, for example, the base 101 may be moved from a first distance above the water bottom 132 to a second distance above the water bottom 132. The first distance may be greater, or less, than the second distance, depending on whether it is desired to increase or decrease the distance of the base 101 from the water bottom 132.

Figure 2C:
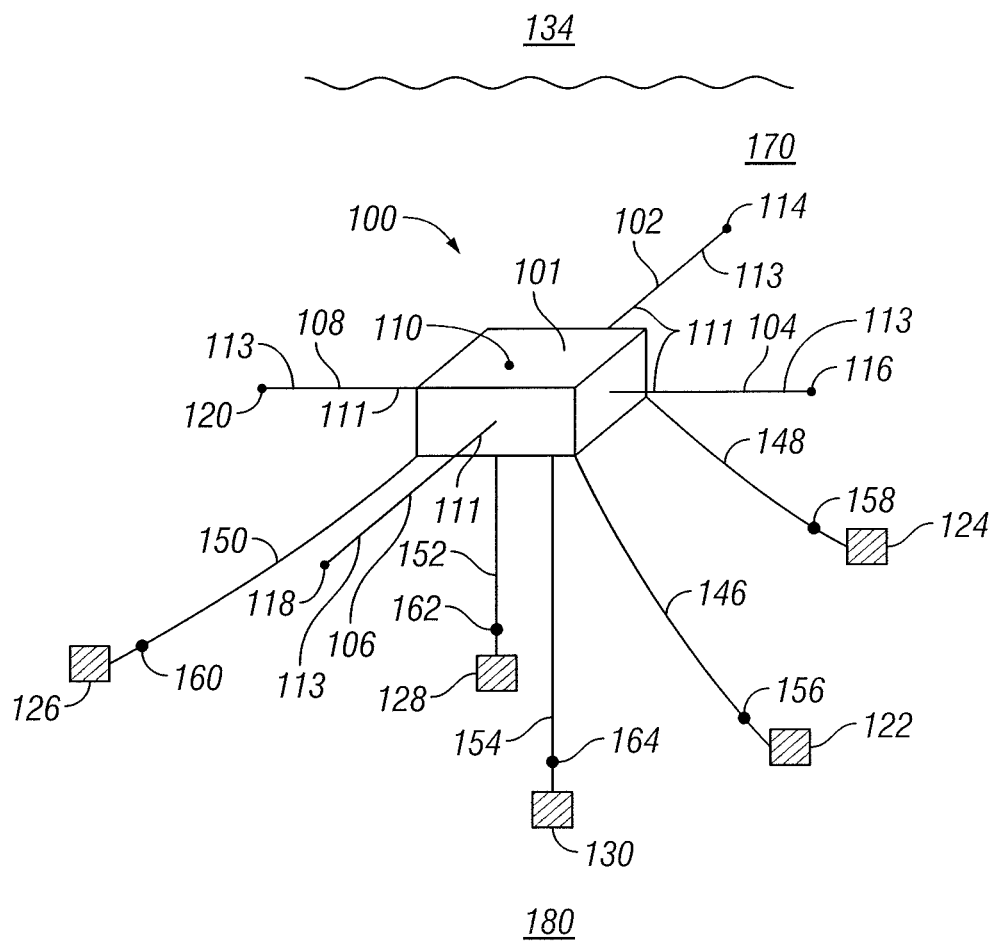

Each of the weights 122, 124, 126, 128 and 130 may be deployable. Each spool may be motorized, thereby allowing winding and unwinding of each line. Also, the weights 122, 124, 126, 128 and 130 may be ejected from base 101. In order to eject the weights 122, 124, 126, 128 and 130 laterally away from the base 101 with significant force, e.g., a force sufficient to place the weights 122, 124, 126, 128 and 130 at desired locations along the water bottom 180, each of the spools 136, 138, 140, 142, and 144 may include a jettison system that may eject the weights 122, 124, 126, 128 and 130 through the body of water 170 and to the water bottom 180. Sensor electronics 110 may be electrically coupled, via wires (not shown), to each of the spools 136, 138, 140, 142, and 144, enabling activation of the motorized spools and the jettison system. During activation, the spools 136, 138, 140, 142, and 144 may wind (retract and/or tighten) the corresponding lines 146, 148, 150, 152, and 154, thus, recovering the weights 122, 124, 126, 128 and 130 and/or stabilizing (via tightening of the line) the weights 122, 124, 126, 128 and 130 against drifting due to subsea conditions, such as, for example, ocean currents. The spools 136, 138, 140, 142, and 144 may also unwind (extend) the lines 146, 148, 150, 152, and 154 and/or jettison the weights 122, 124, 126, 128 and 130, thus, deploying the weights 122, 124, 126, 128 and 130 toward the water bottom 180. FIG. 2C illustrates weights 122, 124, 126, 128 and 130 deployed, and, thus, anchoring first marine data acquisition node 100 to the water bottom 180. After deployment, the lines 146, 148, 150, 152, and 154 may be tightened to stabilize the position of first marine data acquisition node 100. Lines 146, 148, 150, 152, and 154 may also include receiver electrodes 156, 158, 160, 162 and 164, respectively. Each of the receiver electrodes 156, 158, 160, 162 and 164 may be embedded within their respective lines 146, 148, 150, 152, and 154. Electrical wires (not shown) within the lines 146, 148, 150, 152, and 154 may provide for an electrical connection to sensor electronics 110.

Figure 3:
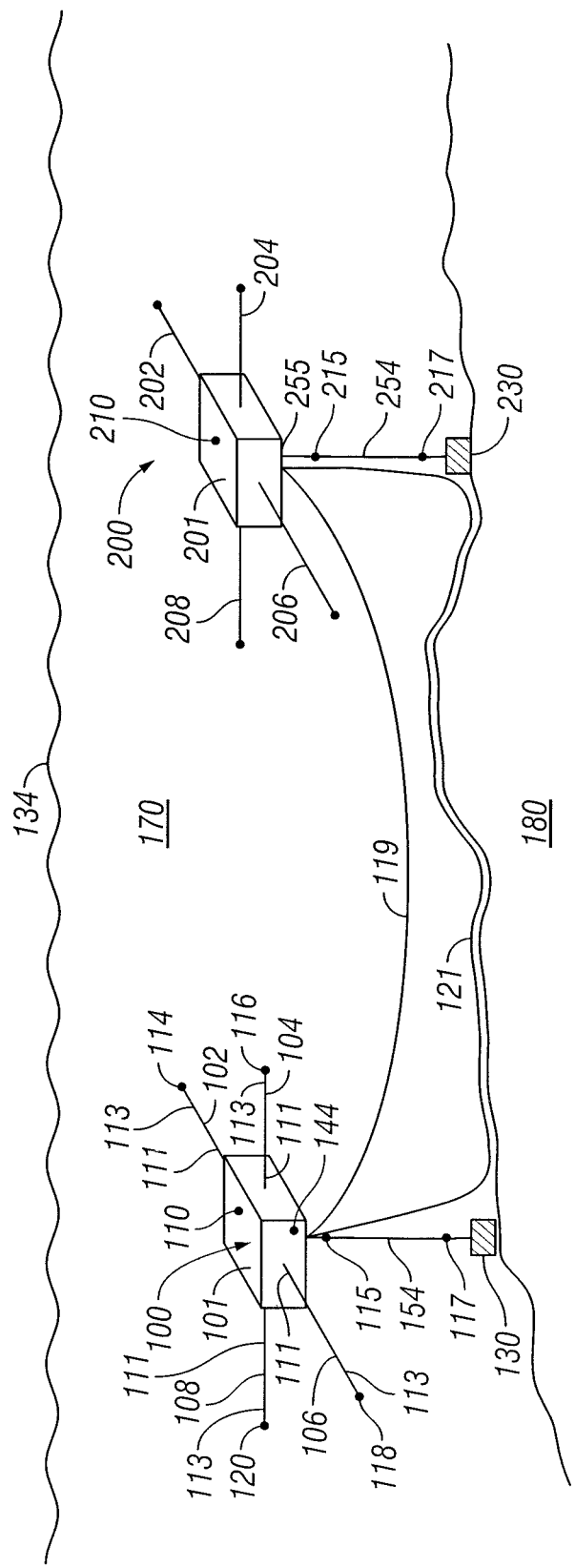
FIG. 3 is a schematic illustration of multiple marine data acquisition nodes attached together, in accordance with example embodiments.

As illustrated in FIG. 3, embodiments may include a first marine data acquisition node 100 and a second marine data acquisition node 200. In some embodiments, one or more receiver electrodes 115, 117 and 215, 217 may be attached to and/or integrated within each of the lines 154, 254, respectively. Lines 154, 254 may couple weights 130, 230 to the first marine data acquisition node 100 and a second marine data acquisition node 200, respectively. Receiver electrodes 115, 117 and 215, 217 may be configured to transfer data to the sensor electronics 110, 210 of first marine data acquisition node 100 and second marine data acquisition node 200, respectively, via electrical conductors (not shown), such as, for example, wires. As illustrated, lines 154, 254 may be oriented vertically and, thus, receiver electrodes 115, 117 and 215, 217 may also be oriented vertically, allowing for measurement of a vertical component of the electric field. The spacing of receiver electrodes 115, 117 and 215, 217 on the corresponding lines 154, 254 may be substantially longer, for example, up to 100 meters or more, than the arms 102, 104, 106, and 108 of the first marine data acquisition node 100 and the arms 202, 204, 206, and 208 of the second marine data acquisition node 200, which may be on the order of tens of meters. This may reduce, mitigate, and/or eliminate movement noise associated with the measurement.

As illustrated in FIG. 3, first marine data acquisition node 100 may include base 101, and second marine data acquisition node 200 may include base 201, in accordance with example embodiments. Weight 130 may anchor first marine data acquisition node 100 to the water bottom 180 via line 154. Weight 230 may anchor second marine data acquisition node 200 to the water bottom 180 via line 254. Each of the lines 154, 254 may be of different lengths and/or may be of adjustable lengths in order to position the first and second marine data acquisition nodes 100, 200 in relation to the water bottom 180 to counter bathymetry variations, for example. The length of one or more lines, such as, for example, lines 154, 254, associated with the first and second marine data acquisition nodes 100, 200, may be adjusted by spools 144, 255 disposed on the corresponding base 101, 201 or coupled thereto. Techniques for coupling the spools 144, 255 to the base 101, 201 of the first and second marine data acquisition node 100, 200 may include any suitable technique known in the art, such as, for example, bolting, screwing, welding, and/or other techniques known in the art. Where first marine data acquisition node 100 is provided with a spool 144, the spool 144 may be actuated so that the first marine data acquisition node 100 may be raised and lowered during a marine geophysical survey to acquire data at different depths. The spool 144 may shorten or lengthen line 154.

In some embodiments, the first marine data acquisition node 100 and the second data acquisition node 200 may be connected together with a first line 119 and/or a second line 121 in order to enable a longer dipole to be created if the electric field is measured between the first marine data acquisition node 100 and the second marine data acquisition node 200, with the first line 119 and/or second line 121 as a reference. While FIG. 3 illustrates use of first line 119 and second line 121, it should be understood that first line 119 and second line 121 may be used independent of one another to couple the first marine data acquisition node 100 and the second marine data acquisition node 200 to one another. First line 119 and/or second line 121 may each comprise high-strength wire or a wire strengthened with a rope or a cable assembly having wire and strength members. First line 119 is suspended between data acquisition node 100 and second data acquisition node 200 such that all or part of first line 119 is not in contact with water bottom 180. Second line 121 may extend along the water bottom 180. The first line 119 and/or the second line 121 may be coupled to base 101 and base 201. Alternatively, more than two marine data acquisition nodes may be connected by multiple lines and may form a mesh-like connection between the marine data acquisition nodes in order to map the potential (voltage) differences of the electric field (at least two points) in the area where the marine data acquisition nodes have been deployed, such as, on the water bottom 180, for example. The voltage readings may be turned into a voltage map of the area where the marine data acquisition nodes have been deployed. Differences, such as, distances between multiple marine data acquisition nodes may be used to estimate the electric field. Also, multiple voltage points may be used to calculate a derivative which may allow avoiding noise or outliers. In some embodiments, when the first marine data acquisition node 100 and the second marine data acquisition node 200 may be released to be returned to the sea surface (e.g. water surface 134 on FIG. 1), the first line 119 and/or second line 121 between the first marine data acquisition node 100 and the second marine data acquisition node 200 may also disconnect at one or more predetermined points to simplify retrieval of the first and second marine data acquisition nodes 100, 200 and/or to reduce, mitigate, and/or eliminate tangle among the first and second marine data acquisition nodes 100, 200 as they travel through the body of water 170 to the water surface 134.

Figure 4:
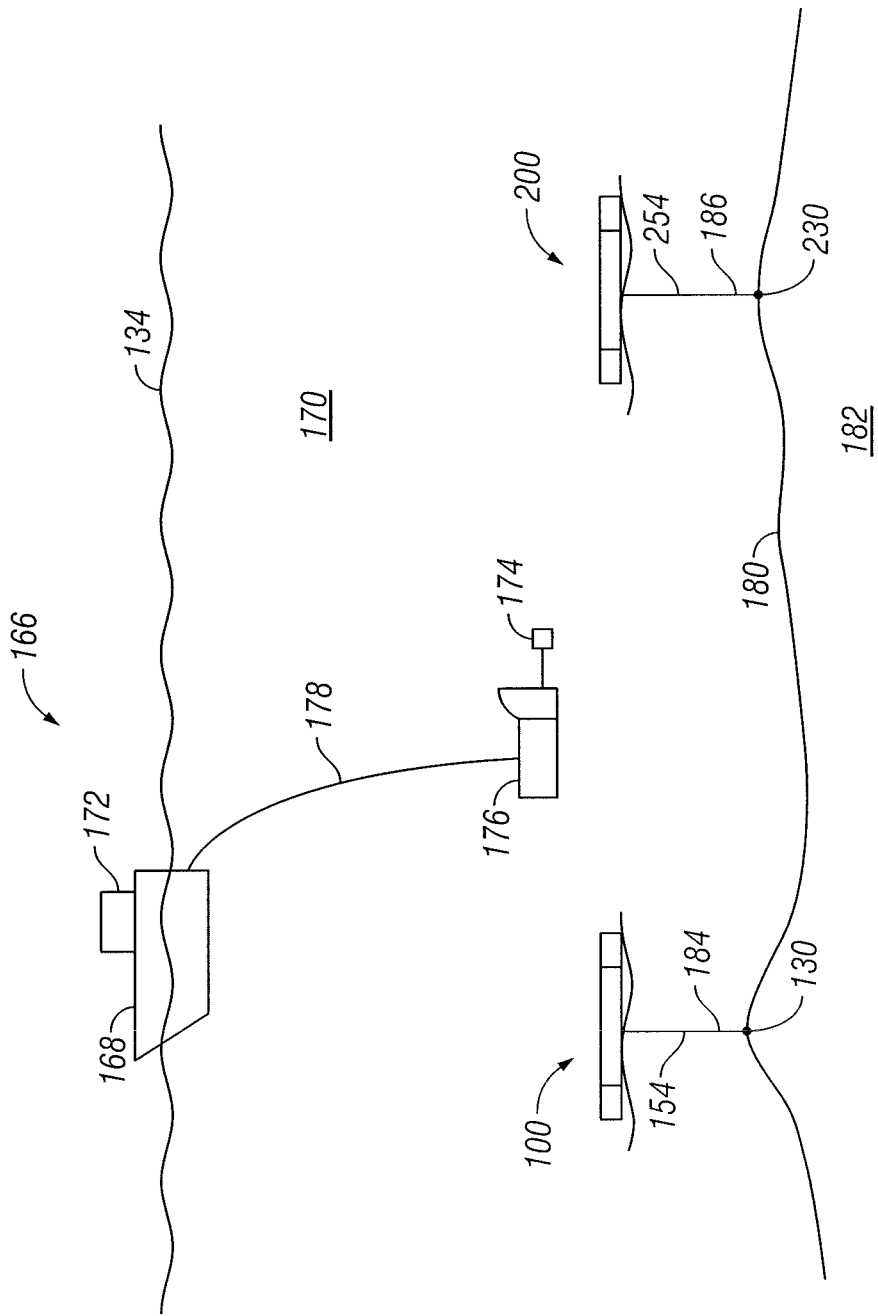
FIG. 4 is a schematic illustration of a geophysical survey system comprising marine data acquisition nodes, in accordance with example embodiments.

FIG. 4 illustrates a marine geophysical survey system 166 that includes a first marine data acquisition node 100 and a second marine data acquisition node 200 in accordance with example embodiments. The marine geophysical survey system 166 includes a survey vessel 168 that moves along the surface of the body of water 170. The survey vessel 168 generally may include equipment, shown generally at 172 and collectively referred to herein as "survey equipment." The survey equipment 172 may include devices (none shown separately) for determining geodetic position of the survey vessel 168 (e.g., a global positioning system satellite receiver signal) and actuating an energy source 174 (explained further below) at selected times, among others. A submersible vehicle 176 carrying the energy source 174 may be attached to the survey vessel 168 by cable 178. The marine geophysical survey system 166 may also include a towed energy source 174 without the assistance of a submersible vehicle 176. Alternatively, marine geophysical survey system 166 may include a submersible vehicle 176 which acts as a remotely operated vehicle (ROV), without the use of cable 178.

As illustrated, one or more marine data acquisition nodes, such as first marine data acquisition node 100 and second marine data acquisition node 200 may be located near the water bottom 180, but not directly on the water bottom 180. Although FIG. 4 illustrates first and second marine data acquisition nodes 100, 200 and one energy source 174, it is to be understood that the number of devices is not a limitation on the scope of the disclosure. First marine data acquisition node 100 may be coupled to weight 130 via line 154. Second marine data acquisition node 200 may be coupled to weight 230 via line 254. Other configurations may include more or fewer than the first and second marine data acquisition nodes 100, 200 and energy source 174. For example, embodiments may include deployment of a plurality of the marine data acquisition nodes 100, 200 near the water bottom 180 wherein the plurality of the marine data acquisition nodes 100, 200 are configured the same.

In operation, the energy source 174 may emit an energy field into the body of water 170 that interacts with subterranean formations 182 below the water bottom 180. Without limitation, the first and second marine data acquisition nodes 100, 200 may detect changes in the energy field due to the interaction with the subterranean formations 182 and generate response signals which may then be recorded for later analysis. When the marine geophysical survey is complete or at another desired time, the burn wires 184, 186 may burn (burn wires 184, 186 may be embedded in lines 154, 254, respectively) allowing the first and second marine data acquisition nodes 100, 200 to float to the water surface 134 for recovery. After recovery, the data stored in each of the first and second marine data acquisition nodes 100, 200 may be analyzed to infer certain properties of the subterranean formations 182.

In some embodiments, a geophysical data product may be manufactured from measurements of one or more components of the energy field made with the marine data acquisition node 100. The geophysical data product may be recorded on one or more non-transitory computer readable media suitable for importing onshore. The imported geophysical data product may be further processed or analyzed via a geophysical analysis.

Although specific systems and methods have been described above, these systems and methods are not intended to limit the scope of the present disclosure, even where only a single system or method is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but systems and methods disclosed herein may provide some, all, or none of such advantages, or may provide other advantages.

Therefore, the present disclosure is well adapted to attain the ends and advantages mentioned as well as those that are inherent therein. The particular systems and methods disclosed above are illustrative only, as the present disclosure may be modified and practiced in different but equivalent manners apparent to those skilled in the art having the benefit of the teachings herein. Although individual systems and methods are discussed, the invention covers all combinations of all those systems and methods. Furthermore, no limitations are intended to the details of construction or design herein shown, other than as described in the claims below. It is therefore evident that the particular illustrative systems and methods disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this disclosure.

What is claimed is:

1. A marine data acquisition node, comprising:
    a base having a buoyancy such that the base is configured to float in a body of water;
    a geophysical sensor coupled to the base;
    a weight configured to anchor the base to a water bottom; and
    a line connected between the weight and the base configured to prevent the base from floating to a surface of the body of water.

2. The marine data acquisition node of claim 1 further comprising an arm coupled to the base, wherein the arm comprises a receiver electrode configured for contact with water.

3. The marine data acquisition node of claim 2 further comprising sensor electronics disposed within the base and electrically coupled to the receiver electrode.

4. The marine data acquisition node of claim 1 further comprising a buoyant material coupled to the base.

5. The marine data acquisition node of claim 1, wherein the base is configured to float above the water bottom.

6. The marine data acquisition node of claim 1 further comprising a release mechanism coupled to the line.

7. The marine data acquisition node of claim 1 further comprising a ballast material disposed within the base.

8. The marine data acquisition node of claim 1 further comprising a spool coupled to the base, wherein the line is at least partially wound on the spool.

9. The marine data acquisition node of claim 1 further comprising a plurality of spools coupled to the base and a plurality of weights coupled to the plurality of spools.

10. A marine electromagnetic survey method, comprising:
    deploying a marine data acquisition node in a body of water, wherein the marine data acquisition node comprises:
        a base having a buoyancy such that the base floats in the body of water;
        a geophysical sensor coupled to the base;
        a weight that anchors the marine data acquisition node to a water bottom; and a line connected between the weight and the base that prevents the base from floating to a surface of the body of water; and emitting an energy field into the body of water.

11. The method of claim 10 further comprising detecting changes in the energy field with the marine data acquisition node due to an interaction with a subterranean formation.

12. The method of claim 10, wherein the energy field is measured with receiver electrodes positioned on an arm attached to the base.

13. The method of claim 12 further comprising recovering the marine data acquisition node from the body of water.

14. The method of claim 13, wherein the recovering comprises decoupling the line between the weight and the base.

15. The method of claim 10, wherein the deploying comprises extending the line from the base such that the weight extends away from the base.

16. The method of claim 10 further comprising moving the base from a first distance above the water bottom to a second distance above the water bottom after the deploying of the marine data acquisition node in the body of water.

17. The method of claim 10, wherein the deploying comprises extending a plurality of lines from the base.

18. The method of claim 17 further comprising adjusting the plurality of lines so that the marine data acquisition node is level.

19. The method of claim 10 further comprising deploying a plurality of marine data acquisition nodes.

20. The method of claim 10 further comprising manufacturing a geophysical data product from measurements of one or more components of the energy field made with the marine data acquisition node; and recording the measurements on one or more non-transitory computer readable media, thereby creating the geophysical data product suitable for importing onshore.

21. A method of manufacturing a geophysical data product, comprising:

deploying a marine data acquisition node in a body of water, wherein the marine data acquisition node comprises:
  a base having a buoyancy to float in the body of water;
  a geophysical sensor coupled to the base;
  a weight that anchors the marine data acquisition node to a water bottom; and
  a line;

emitting an energy field into the body of water;

measuring one or more components of the energy field with the marine data acquisition node to provide measurements; and recording the measurements made with the marine data acquisition node on one or more non-transitory computer readable media, thereby creating the geophysical data product.

22. The method of claim 21 further comprising importing the geophysical data product onshore and performing further data processing or geophysical analysis on the geophysical data product.

23. The method of claim 21 wherein the energy field is an electromagnetic field.

24. The method of claim 21 further comprising recovering the marine data acquisition node from the body of water, wherein the recovering comprises activating a release mechanism to release the base from the weight.

25. The method of claim 21, wherein the deploying comprises extending the line toward the water bottom.

26. An electromagnetic survey system, comprising:
an electromagnetic source configured to emit an energy field into a body of water;
a marine data acquisition node comprising:
a base having a buoyancy such that the base is configured to float in a body of water;
a geophysical sensor coupled to the base;
a weight configured to anchor the marine data acquisition node to a water bottom; and
a line connected between the weight and the base configured to prevent the base from floating to a surface of the body of water.

27. The electromagnetic survey system of claim 26, wherein the marine data acquisition node comprises an al iii coupled to the base, wherein the arm comprises a receiver electrode configured for contact with water.

28. The electromagnetic survey system of claim 26 further comprising a submersible vehicle coupled to the electromagnetic source.

29. The electromagnetic survey system of claim 26 wherein the base is not positioned directly on the water bottom.

30. The electromagnetic survey system of claim 26, wherein the geophysical sensor is capable of detecting changes in an energy field due to an interaction with a subterranean formation.

* * * * *